UNITED STATES PATENT OFFICE 2,423,951

CATALYTIC PROCESS FOR THE PRODUCTION OF BUTADIENE AND CATALYST THEREFOR

Le Roy U. Spence, Elkins Park, and Darrel J. Butterbaugh, Philadelphia, Pa., assignors to Rohm & Haas Company, Philadelphia, Pa., a corporation of Delaware No Drawing. Application August 30, 1944, Serial No. 551,998

7 Claims. (Cl. 260—681)

This invention concerns the preparation of butadiene. With greater particularity, it concerns the production of butadiene and acetaldehyde from ethanol by passage over certain zinc catalysts as described below at elevated temperatures. These catalysts are also within the scope of this invention.

With the aid of these catalysts, ethanol is converted with good efficiency to other useful products and but relatively little of the ethanol is lost by conversion to hydrogen, ethylene, and/or butylene. From 20% to 40% of the ethanol may be readily converted to butadiene with the aid of these catalysts and from 25% to 60% to acetaldehyde. These products are readily separable and may be used as such. Alternatively, the acetaldehyde may be converted to another useful product, including butadiene. It is particularly valuable for the latter purpose in that mixtures of acetaldehyde and ethanol are efficiently and economically convertible with high yields to butadiene on catalysts comprising alkali-digested mixtures of silicon dioxide and zirconium, thorium, or magnesium oxide, which catalysts are described in our co-pending applications, Serial Nos. 551,988 and 551,996, filed on even date. The conjoint use of the zinc catalysts of this invention and the aforesaid alkali-digested mixtures is also within the purview of this invention.

According to the present invention, ethanol or mixtures comprising ethanol in major proportion are vaporized and passed over the catalyst at a temperature of about 375° to about 500° C. at normal pressures or at pressures above normal to well below normal. The gases from the catalyst are cooled to about 0° C. or lower to condense water, alcohol, aldehyde, or other products which are readily liquified. The butadiene may then be recovered from the gases by known methods, such as absorption in a solvent. Unchanged alcohol, together with aldehyde, may be returned to the reaction zone for further reaction on the catalyst. In a single pass over the catalyst from 20% to 40% of the alcohol may be converted to butadiene and at the same time 30% to 60% of the alcohol may be changed to acetaldehyde. When the recovered alcohol and aldehyde are recycled, yields of butadiene of 30% to 40% on the basis of the alcohol decomposed are generally obtained, while the yield of aldehyde is 30% to 40% on the same basis.

Continuous operation is conveniently accomplished with recycling of all or of part of the acetaldehyde with removal of some of the acetaldehyde formed in the conversion. If the removed acetaldehyde is mixed with ethanol and the resulting mixture passed over one of the catalysts disclosed in our aforementioned copending applications, yields of butadiene of 55% to 60% of theory become possible and practical.

The zinc catalysts useful for carrying out this invention comprise zinc oxide modified with the zinc salts of silicic, phosphoric, or tungstic acid. These catalysts are preferably used in conjunction with a carrier therefor, such as silica. They may be prepared by precipitation of a soluble zinc salt with an alkali and conversion of at least part of the zinc to a silicate, phosphate, or tungstate. When a soluble zinc salt, such as zinc chloride or nitrate, is mixed with an alkali in aqueous solution, such as lithium, sodium, or potassium hydroxide, a silicate, phosphate, or tungstate may be present and carried down with the precipitating hydrous zinc oxide. On the other hand, the zinc salt may be decomposed with an alkali and the resulting precipitate treated with a silicate, phosphate, or tungstate.

An especially useful and convenient method for preparing the active zinc catalysts of this invention lies in the precipitation of hydrous zinc oxide in the presence of a reactive form of silica, such as silica gel or diatomaceous earth. The precipitate, together with the silica, may then be digested with a 0.1% to 8% solution of an alkali with formation of silicate in the mixture. Digestion may be effected at temperatures of 50° C. or more and is most conveniently done by refluxing an aqueous alkaline suspension. As an alkali there may be used a strongly alkaline base such as lithium, sodium, potassium, rubidium or cesium hydroxide, or a strongly alkaline quaternary ammonium hydroxide such as benzyl trimethyl ammonium hydroxide or dibenzyl dimethyl ammonium hydroxide, or an alkali metal silicate such as sodium or potassium silicate. The latter may also serve as a source of silica and silicate.

The precipitated hydrous oxide may be treated with a soluble phosphate or tungstate including the alkali metal, ammonium or amine salts thereof or dilute solution of the acids corresponding thereto.

It is of interest to note that zinc oxide alone or zinc oxide in conjunction with aluminum oxide acts as a catalyst which causes an appreciable amount of the ethanol passed thereover at elevated temperatures to give low yields of butadiene and acetaldehyde. Silica is relatively inert to ethanol. Yet the activated zinc oxide-silica combination is a very effective catalyst. The alkali-digestion of this combination forms silicates which are effective and the phosphates and tungstates are similarly effective and equivalent to the silicates in this respect.

After precipitation and digestion or treatment of the precipitated zinc compound, it may be dried, usually at temperatures of 100° C. to 150° C., broken into pieces of a suitable size, preferably 4 to 8 mesh and may then, if desired, be heated at 350° to 450° C. to remove all moisture. In another method of preparing the catalysts of this invention, the precipitated material may be shaped as by extrusion of a moist paste and dried at 350° to 450° C.

The catalysts of this invention are rugged and retain their acivity in continuous use for several days. They gradually decrease in activity, however, because of carbonaceous deposits. These may be burned off with air at 400° to 600° C. and the activity of the catalyst restored.

Further details of the preparation of the zinc catalysts are given in the following illustrative examples.

EXAMPLE 1

*Preparation of catalyst No. 702.*—To one liter of water there was added 73 grams of zinc nitrate and 75 grams of a purified diatomaceous earth. This mixture was treated with 25 grams of sodium hydroxide and the resulting mixture digested for two hours at 90° to 95° C. It was then cooled and filtered. The filter cake was washed four successive times each with a one liter portion of water. It was then dried at 100° C. and broken up into 4 to 8 mesh particles which were heated in an oven at 425° C.

EXAMPLE 2

*Preparation of catalyst No. 835.*—In a liter of water there was dissolved 75 grams of zinc nitrate and 75 grams of silica gel powder was added thereto and also 240 grams of a 40% solution of trimethyl benzyl ammonium hydroxide ("Triton B"). This mixture was digested for two hours at 90° to 95° C., then cooled, and filtered. The filter cake obtained was washed three times with one liter portions of water, dried at about 100° C., broken up into small pieces, and ignited at about 425° C.

EXAMPLE 3

*Preparation of catalyst No. 735.*—To a solution of 73 grams of zinc nitrate in one liter of water 75 grams of diatomaceous earth was added. This mixture was heated to 80° C. and then there was added a solution of 21 grams of a sodium silicate containing 0.018 gram-mol of silica and 0.492 gram-mol of sodium hydroxide. This mixture was stirred and maintained at about 80° C. for some time. It was then cooled and the precipitate which had formed was filtered off. The filter cake was well washed, dried at about 100° C., broken into pieces of 4 to 8 mesh size, and heated in an oven at 425° C. for an hour.

EXAMPLE 4

*Preparation of catalyst No. 817.*—A solution of sodium silicate was prepared containing 0.246 gram-mol of silicon dioxide and 0.492 gram-mol of sodium hydroxide. To this solution there was slowly added with stirring a hot solution containing 0.246 gram-mol of zinc nitrate in one liter of water and having suspended therein 75 grams of iron-free diatomaceous earth. The resulting mixture was stirred and heated and then cooled to 35° C. and filtered. The filter cake obtained was thoroughly washed with water, dried at about 100° C., broken into particles of about 8 mesh size, and heated in an oven at 425° C.

EXAMPLE 5

*Preparation of catalyst No. 824.*—A dilute solution containing about 37 grams of zinc acetate was treated with a solution of 3 grams of potassium hydroxide and then with about 100 cc. of an approximately 10% solution of phosphoric acid. The resulting precipitate was filtered, washed, and dried. It was then mixed with 75 grams of diatomaceous earth in a liter of water. The suspension was filtered and dried, broken into particles, and finally ignited at about 425° C.

It will be evident that any water-soluble phosphate may be used in the preparation of the zinc catalysts modified with zinc phosphate.

EXAMPLE 6

*Preparation of catalyst No. 809.*—A solution of 19 grams of zinc nitrate was prepared in one liter of water, 75 grams of purified diatomaceous earth was added thereto, and the temperature of the mixture was raised to 80° C. A solution of 21 grams of sodium tungstate in 400 cc. of water was gradually added with good stirring. The resulting mixture was cooled and filtered. The filter cake was washed, then dried, broken into small particles, and heated at about 425° C.

In place of sodium tungstate as a modifying agent for the zinc catalysts, there may be used any of the water-soluble tungstates.

EXAMPLE 7

*Preparation of catalyst No. 802.*—There was dissolved in one liter of water 73 grams of zinc nitrate. 75 grams of purified diatomaceous earth was added to the solution. A solution of 20 grams of sodium hydroxide in 400 cc. of water was prepared and stirred into the solution containing zinc nitrate and diatomaceous earth. The mixture resulting was filtered and the solids carefully washed. They were then impregnated with a solution of 1.25 grams of tungstic acid in 50 cc. of dilute ammonium hydroxide. The resulting mixture was thoroughly washed, pressed into a firm cake, and dried at 100° C. The dried cake was broken up, sifted to 4 to 8 mesh particles, and dried at 425° C.

EXAMPLE 8

*Preparation of catalyst No. 793.*—A solution of 73 grams of zinc nitrate was made in one liter of water and 75 grams of diatomaceous earth added thereto. A solution of about 20 grams of sodium hydroxide was made in 400 cc. of water and added to the zinc nitrate solution with good stirring. The resulting suspension was filtered and washed. It was then treated with a solution of 3.25 grams of tungstic acid in 75 cc. of warm dilute ammonium hydroxide. This mixture was partially dried, pressed into a firm cake, and heated at 100° C. until quite dry. It was then crushed and sieved to 4 to 8 mesh size and heated in an oven at about 425° C.

The above prepared catalysts containing zinc oxide converted at least in part to silicate, phosphate, or tungstate, along with other catalysts based on zinc oxide, were used for the conversion of ethanol to butadiene and acetaldehyde by the methods discussed below.

It was found that the ethanol need not be pure. It could contain considerable quantities of water and still be converted with good yields. In fact, better yields were obtained from alcohols containing 10% to 25% water than from the 95% ethanol of commerce. As has been indicated above, ethanol may be mixed with considerable aldehyde and subjected to conversion. Considerable aldehyde is, of course, present in recycling.

In the first set of tests of catalysts recycling was used. A charge of 125 cc. of 95% ethanol was placed in a distilling flask, which was heated to vaporize the alcohol, which then passed through heated tubing to a tube containing about 100 cc. of the catalyst being examined. This tube was placed within an electrically heated tube furnace. The flow from the catalyst tube was through a coil in an ice bath. Condensate from this coil flowed into a trap from which it could be returned to the distilling flask for recycling. The gases from the coil were passed through two traps in an acetone-"dry ice" bath where butadiene was condensed in large part, and then through an alcohol scrubber, also chilled with solid carbon dioxide. Fixed gases were measured and collected for analysis.

The coil in the ice bath condensed most of the acetaldehyde, unreacted alcohol, and water. The traps and scrubber (at −60° to −70° C.) caught the rest of such products, butadiene, and the small amount of butene formed in the conversion. The exhaust gases consisted primarily of hydrogen and ethylene.

The crude butadiene condensate was fractionated and the actual amount of butadiene determined by chemical methods (maleic anhydride). In continuous production, any alcohol and aldehyde obtained in this step would be returned to the reaction system. They were not so returned in the tests here reported.

The recycling was continued until 75% to 85% of the alcohol had been decomposed. The products were then determined. The amount of alcohol decomposed was calculated and used as a basis for calculating the percentage conversion to butadiene and acetaldehyde. Since the acetaldehyde is useful, particularly in conjunction with additional ethanol, to give excellent yields of butadiene on activated zirconia, thoria, or magnesia catalysts, the efficiency of the process for production of butadiene in the last analysis depends only upon the alcohol not converted to acetaldehyde. This efficiency was calculated and found to vary from about 50% to about 60%.

Typical runs with the zinc oxide catalysts at least partially converted to silicate, phosphate, or tungstate are summarized in Table I. In the first column, the run number is given in which the catalyst identified in the next two columns by number and type was used. The fourth column shows the temperature of the catalyst bed in degrees centigrade as determined with a thermocouple. In the fifth column, the length of time in minutes is recorded for each run reported. Then follow two columns in which there is recorded the per cent conversion of the alcohol to acetaldehyde (AcH) and butadiene ($C_4H_6$) respectively. The next-to-last column gives the production rate in grams of butadiene per hour for the particular unit used in the preparation. In the last column, there is recorded the yield of butadiene based on the alcohol decomposed and not accounted for by the acetaldehyde.

TABLE I

Conversion of ethanol with recycling

| Run No. | Catalyst No. | Type of Catalyst | Temp., °C. | Time, Min. | Conversion, Per Cent | | Prod. Rate | Yield, Per Cent |
|---|---|---|---|---|---|---|---|---|
| | | | | | AcH | $C_4H_6$ | | |
| 449 | 742 | ZnO-silica, NaOH digestion | 428 | 116 | 35 | 37 | 5.3 | 56.5 |
| 580 | 835 | ZnO-silica, Triton B digestion | 415 | 74 | 30 | 34 | 7.9 | 48.1 |
| 438 | 735 | ZnO-silicate digestion | 400 | 60 | 36 | 31 | 13.4 | 48.2 |
| 548 | 817 | Zn silicate pptn | 420 | 94 | 26 | 36 | 11.0 | 47.6 |
| 552 | 824 | Zn phosphate pptn | 440 | 94 | 47 | 27 | 7.1 | 51.5 |
| 530 | 809 | Zn tungstate pptn | 400 | 81 | 27 | 37 | 10.5 | 51.0 |
| 520 | 802 | ZnO-tungstate 2% | 415 | 99 | 30 | 38 | 7.7 | 53.7 |
| 750 | 793 | ZnO-tungstate 5% | 400 | 154 | 32 | 40 | 6.0 | 59.0 |
| 751 | 793 | ZnO-tungstate 5% | 425 | 105 | 32 | 36 | 8.1 | 52.8 |

Runs were also made with various catalysts in which a charge of ethanol was placed in the distilling flask and heated with the vapors driven through the catalyst tube without recycling. The products were collected as before and determined. The results are recorded in Table II. The arrangement of this table is generally similar to that of Table I, except that some additional data are given. The significance of the data will be evident from the discussion given above. In runs numbered 553, 620, and 615 commercial 95% ethanol was used. In runs numbered 766 and 768 this alcohol was diluted with water to an 80% ethanol content. It will be seen that addition of water does not lessen the yield.

TABLE II

Conversion of ethanol in a single pass over activated zinc catalyst

| Run No. | Catalyst No. | Temp., °C. | Time, Min. | Ethanol Consumed, Per Cent | Conversion to— | | | Prod. Rate | Yield, Per Cent |
|---|---|---|---|---|---|---|---|---|---|
| | | | | | AcH | $C_2H_4$ | $C_4H_6$ | | |
| 553 | 742 | 450 | 46 | 61 | 50 | 1.3 | 29 | 12.2 | 58.1 |
| 620 | 824 | 415 | 33 | 56 | 66 | 0.9 | 22 | 17.6 | 63.2 |
| 615 | 793 | 430 | 46 | 66 | 63 | 1.7 | 19 | 17.4 | 50.2 |
| 766 | 793 | 405 | 40 | 40 | 51 | 2.1 | 26 | 12.7 | 54.0 |
| 768 | 793 | 430 | 39 | 55 | 59 | 1.8 | 22 | 15.4 | 54.8 |

As will be seen from the above data, very favorable yields of butadiene are obtained by passing ethanol over our zinc oxide catalysts which have been modified at least in part to silicate, phosphate, or tungstate. Considerable acetaldehyde is formed in the conversion. This may be used as such or used in the production of butadiene, either in recycling over the same catalyst or more efficiently by passage of the recovered alcohol and the aldehyde over our activated zirconium oxide, thorium oxide, or magnesium oxide catalysts, or by mixture with ethanol and passage over these catalysts which are described in our aforementioned co-pending cases in this same field or over other catalysts which are capable of converting ethanol to butadiene. Our catalysts, however, are particularly efficient and effective for converting the aforesaid mixtures to butadiene.

In application Serial No. 551,988, filed on even date, zirconium oxide or thorium oxide, prepared from water-soluble salts, such as nitrates or chlorides, is combined with an active form of silica and digested in an alkaline solution to give an activated catalyst. An alkali hydroxide may be used to digest a mixture of the oxide and silica or a soluble silicate may be used to supply both silica and alkali for digestion. On such catalysts, mixtures of acetaldehyde and ethanol up to about 50 mol per cent of acetaldehyde give improved yield with an optimum yield at about 30 mol per cent of acetaldehyde. The rate of reaction of such mixtures is higher than when ethanol is used alone, less hydrogen is formed paralleling increased efficiency, the gaseous products are therefore richer in butadiene, and the process is operated under optimum conditions.

There may likewise be used the magnesium oxide catalysts described in application Serial No. 551,996, filed on even date. At temperatures of 375° C. to 525° C., the alkali-digested mixtures of magnesium oxide and active silica are highly efficient in the preparation of butadiene from mixtures of ethanol and acetaldehyde with the same advantages stated above for the activated zirconium oxide catalysts.

We claim:

1. A process for producing butadiene which comprises vaporizing ethanol, passing the resulting vapors over a catalyst comprising zinc oxide modified with a zinc salt selected from the group consisting of silicate, phosphate, and tungstate, while maintaining said catalyst at a temperature between 375° C. and 500° C., to form a gaseous mixture containing butadiene and separating butadiene from said mixture.

2. A process for producing butadiene which comprises vaporizing ethanol, passing the resulting vapors over a catalyst comprising zinc oxide modified with zinc silicate, while maintaining said catalyst at a temperature between 375° C. and 500° C., to form a gaseous mixture containing butadiene and separating butadiene from said mixture.

3. A process for producing butadiene which comprises vaporizing ethanol, passing the resulting vapors over a catalyst comprising zinc oxide modified with zinc phosphate, while maintaining said catalyst at a temperature between 375° C. and 500° C., to form a gaseous mixture containing butadiene and separating butadiene from said mixture.

4. A process for producing butadiene which comprises vaporizing ethanol, passing the resulting vapors over a catalyst comprising zinc oxide modified with zinc tungstate, while maintaining said catalyst at a temperature between 375° C. and 500° C., to form a gaseous mixture containing butadiene and separating butadiene from said mixture.

5. A process for producing butadiene which comprises vaporizing ethanol, passing the vapors thereof over a catalyst comprising zinc oxide modified with a zinc salt selected from the group consisting of silicate, phosphate, and tungstate, while maintaining said catalyst at a temperature between 375° C. and 500° C., to form a gaseous mixture, cooling said gaseous mixture to about 0° C. and condensing a portion of said gaseous mixture, separating the condensed portion from the remaining gaseous portion, removing butadiene from said remaining gaseous portion, vaporizing said condensed portion and passing the vapors thereof over a catalyst comprising an alkali-digested mixture of magnesium oxide and silica, to form a gaseous mixture containing butadiene, and separating the butadiene therefrom.

6. A process for producing butadiene which comprises vaporizing ethanol, passing the vapors thereof over a catalyst comprising zinc oxide modified with a zinc salt selected from the group consisting of silicate, phosphate, and tungstate, while maintaining said catalyst at a temperature between 375° C. and 500° C., to form a gaseous mixture, cooling said gaseous mixture to about 0° C. and condensing a portion of said gaseous mixture, separating the condensed portion from the remaining gaseous portion, removing butadiene from said remaining gaseous portion, vaporizing said condensed portion and passing the vapors thereof over a catalyst comprising an alkali-digested mixture of zirconium oxide and silica, to form a gaseous mixture containing butadiene, and separating the butadiene therefrom.

7. A process for producing butadiene which comprises vaporizing ethanol, passing the vapors thereof over a catalyst comprising zinc oxide modified with a zinc salt selected from the group consisting of silicate, phosphate, and tungstate, while maintaining said catalyst at a temperature between 375° C. and 500° C., to form a gaseous mixture, cooling said gaseous mixture to about 0° C. and condensing a portion of said gaseous mixture, separating the condensed portion from the remaining gaseous portion, removing butadiene from said remaining gaseous portion, vaporizing said condensed portion and passing the vapors thereof over a catalyst comprising an alkali-digested mixture of thorium oxide and silica, to form a gaseous mixture containing butadiene, and separating the butadiene therefrom.

LE ROY U. SPENCE.
DARREL J. BUTTERBAUGH.

REFERENCES CITED

The following references are of record in the file of this patent:

UNITED STATES PATENTS

| Number | Name | Date |
|---|---|---|
| 1,577,189 | Patrick | Mar. 16, 1926 |
| 2,272,301 | Kinneberg | Feb. 10, 1942 |
| 2,357,855 | Szukiewicz | Sept. 12, 1944 |
| 1,809,978 | Larson | June 16, 1931 |
| 2,265,641 | Grosskinsky et al. | Dec. 9, 1941 |
| 2,204,157 | Semon | June 11, 1940 |
| 2,374,433 | Ipatieff | Apr. 24, 1945 |

FOREIGN PATENTS

| Number | Country | Date |
|---|---|---|
| 577,630 | Germany | June 3, 1933 |